United States Patent [19]

Hirano

[11] Patent Number: 4,966,251
[45] Date of Patent: Oct. 30, 1990

[54] AUTOMOTIVE VEHICLE WITH CENTER BEARING OF PROPELLER SHAFT ASSEMBLY VARIABLE IN POSITION

[75] Inventor: Yoshinori Hirano, Yokohama, Japan

[73] Assignee: Nissan Motor Co., Ltd., Japan

[21] Appl. No.: 355,658

[22] Filed: May 23, 1989

[30] Foreign Application Priority Data

May 24, 1988 [JP] Japan ................................. 63-125044

[51] Int. Cl.$^5$ ............................................. B60K 17/22
[52] U.S. Cl. ..................................... 180/338; 180/381
[58] Field of Search ............... 384/512, 583, 257, 247; 180/338, 377, 379, 381, 382, 337

[56] References Cited

U.S. PATENT DOCUMENTS

| | | | |
|---|---|---|---|
| 2,776,174 | 1/1957 | McMillan et al. | 180/381 |
| 2,857,974 | 10/1958 | Heller | 180/381 |
| 2,939,540 | 6/1960 | Halber et al. | |
| 3,175,636 | 3/1965 | Winkelmann | 180/381 |
| 3,504,573 | 4/1970 | Yoshida | 180/381 |

Primary Examiner—David M. Mitchell
Assistant Examiner—Karin Tyson
Attorney, Agent, or Firm—Leydig, Voit & Mayer

[57] ABSTRACT

A system for reducing vibration and noise generated from a propeller shaft assembly of an automotive vehicle comprises a center bearing which is variable in position relative to the vehicle body under the control of a controller.

25 Claims, 7 Drawing Sheets

CORRECTION AMOUNT OF DISPLACEMENT OF
SUPPORTING POSITION OF CENTER BEARING

BASE AMOUNT OF DISPLACEMENT OF
SUPPORTING POSITION OF CENTER BEARING

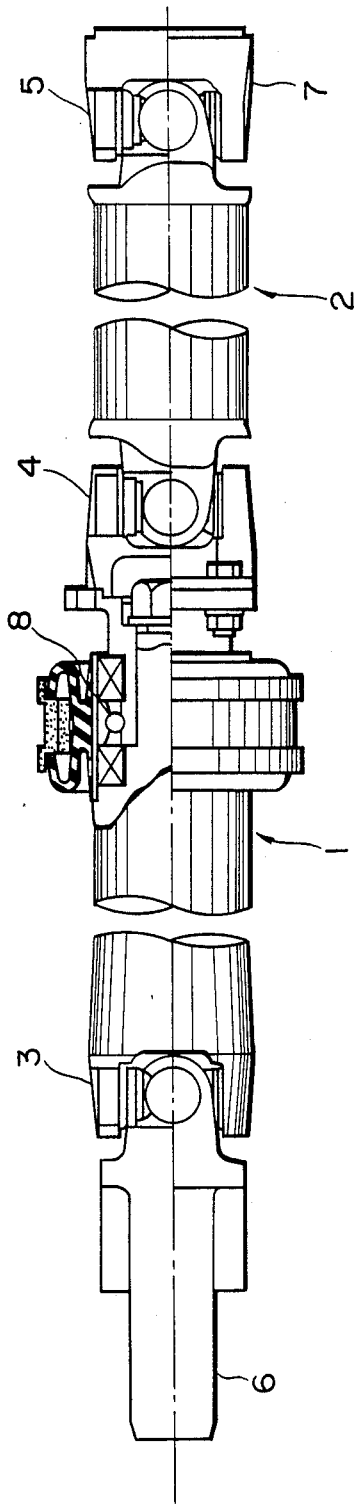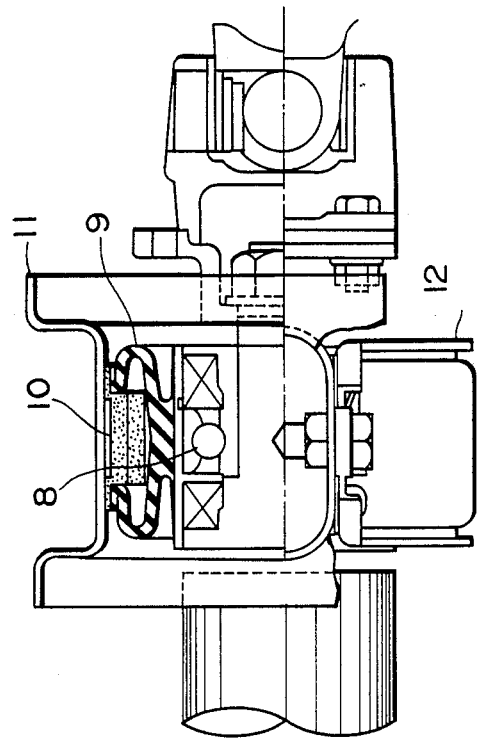
FIG. 7a (PRIOR ART)
FIG. 7b (PRIOR ART)

AUTOMOTIVE VEHICLE WITH CENTER BEARING OF PROPELLER SHAFT ASSEMBLY VARIABLE IN POSITION

BACKGROUND OF THE INVENTION

1. Field of the Invention

The present invention relates to an automotive vehicle in which the center position of a center bearing of a propeller shaft assembly is variable relative to the vehicle body, and more particularly to a system for reducing vibration and noise due to secondary couple generated with angles of cardan joints upon vehicle starting.

2. Description of the Prior Art

There is shown, by way of example, a propeller shaft of the prior art in FIG. 7a, in which reference numerals 1 and 2 denote a first propeller shaft and a second propeller shaft of a propeller shaft assembly, respectively, and 3, 4 and 5 denote cardan joints (referred to hereinafter as first, second and third cardan joints) which swingably connect a main shaft or a transmission output shaft 6 with the first propeller shaft 1, the first propeller shaft 1 with the second propeller shaft 2 and the second propeller shaft 2 with a drive pinion of a differential 7. A center bearing 8 is fixed near the middle position of the shaft total length obtained by adding the length of the first propeller shaft 1 to that of the second propeller shaft 2. As seen from an enlarged detail show in FIG. 7b, the center bearing 8 is supported by an upper bracket 11 connected to a vehicle body through a cushion rubber layer 10. A lower bracket 12 is connected to the upper bracket 11 by means of a bolt. With this propeller shaft, when vibration is transmitted to the first and second propeller shafts 1, 2 from the main shaft 6 and the differential 7, the propeller shaft 1 moves up and down in a movable area defined by the center bearing 8 and the upper and lower brackets 11, 12, which are cushioned by an insulator 9 and the cushion rubber layer 10. A vehicle having this 3-joint type propeller shaft was good noise characteristics at a high speed and critical engine speed performance compared with a vehicle having a 2-joint type propeller shaft, so that the 3-joint type propeller shaft is frequently used in small vehicles in recent years.

The 3-joint type propeller shaft offers the above-mentioned advantages, but this propeller shaft is worse than the 2-joint type propeller shaft in respect to vibration and noise due to secondary couple generated with angles of cardan joints during vehicle starting when there occurs wind-up of the differential. That is, with the 2-joint type, the above-mentioned vibration and noise can be reduced by arranging the main shaft and the differential on the same straight line to provide a drive system in which variations in exciting force become small when there occurs wind-up of the differential. On the other hand, with the 3-joint type, the propeller shaft is fixed to the vehicle body by the center bearing so that a certain angle is inevitably formed between the main shaft and the differential. Specifically, during vehicle starting where there are great variations the propeller shaft torque, which is proportional to input torque, the insulator and the cushion rubber are not sufficient for preventing the above-mentioned vibration and resultant noise.

It is therefore an object of the present invention to provide a system for reducing vibration and noise derived from a drive system of an automotive vehicle owing to a propeller shaft assembly.

SUMMARY OF THE INVENTION

An automotive vehicle according to the present invention includes a vehicle body and drive means. A propeller shaft is operatively connected between the drive means and a differential. Driving wheels are operatively connected to the differential. The propeller shaft assembly is rotatably supported by a center bearing. The center bearing is supported by a bracket structure which is connected to the vehicle body. The bracket structure can vary the position of the center bearing relative to the vehicle body in accordance with a vehicle operating condition.

A method of suppressing noise in an automotive vehicle according to the present invention includes the steps of sensing an operating condition of the vehicle and generating a sensor output signal, generating a control signal in response to the sensor output signal, and varying the position of a center bearing of a propeller shaft assembly relative to the body of the vehicle in response to the control signal.

BRIEF DESCRIPTION OF THE DRAWINGS

FIGS. 7a and 7b are diagrammatic views respectively showing a propeller shaft of the prior art and details of its center bearing portion.

DETAILED DESCRIPTION OF THE INVENTION

Figure 1:
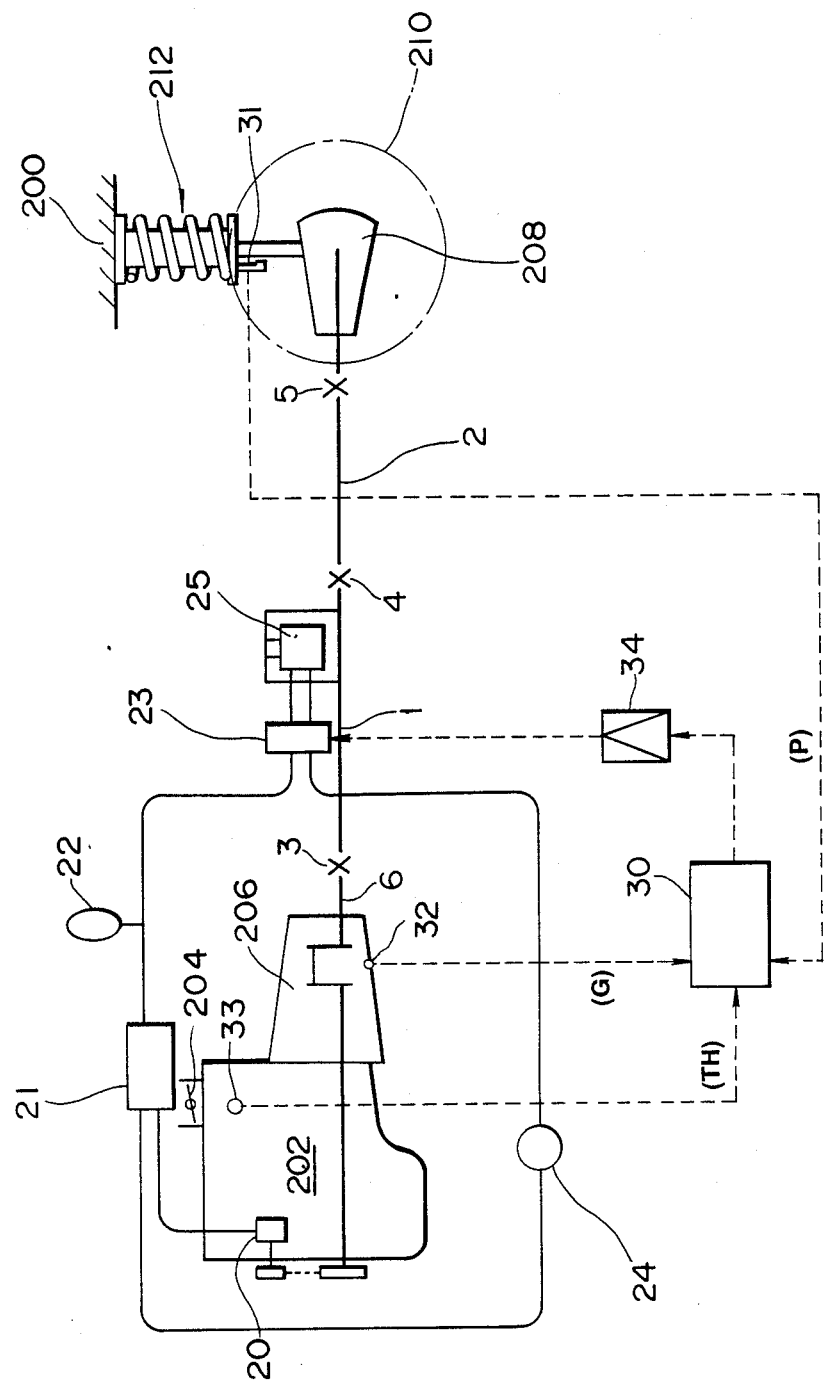
FIG. 1 is a diagrammatic view showing a portion of an automotive vehicle with a drive system including a propeller shaft assembly with a variable-position center bearing under the control of a controller.

Referring first to FIG. 1, there is shown a drive system of an automotive vehicle with a vehicle body 200. The drive system includes an engine 202 with a throttle 204 which opens in degrees, a transmission 206 operatively coupled with the engine 202, a propeller shaft assembly including a first and second propeller shafts 1 and 2, a differential 208, and a pair of driving wheels, only one being shown in phantom and designated by 210. A rear suspension system 212 is operatively connected between the driving wheels 210 and the vehicle body 200 to support the weight of the vehicle body 200.

A hydraulic pump 20 provides a hydraulic pressure to a servo valve 23 through an unloading pressure control valve 21 and an accumulator 22. A reservoir 24 is interposed between the unloading pressure control valve 21 and the servo valve 23, and an actuator 25 is used for controlling a center bearing supporting position. The actuator 25 is connected to the unloading pressure control valve 21. A controller 30, is connected to a position sensor 31 which is a potentiometer in this embodiment for sensing the amount of compression of a rear suspension, a gear position sensor 32 for sensing a gear position and a throttle opening sensor 33 for sensing a throttle opening degree of an engine throttle valve. A position signal P, a gear position signal G and a throttle opening signal TH are provided to the controller 30 by the position sensor 31. The gear position sensor 32, and the throttle opening sensor 83, respectively. The controller 30 is also connected to a servo amplifier 34 which provides a control signal to the servo valve 23 in response to a control signal provided from the controller 30. The servo valve 23 hydraulically actuates a movable rod 25a of the actuator 25 in response to the control signal.

Figure 2A:
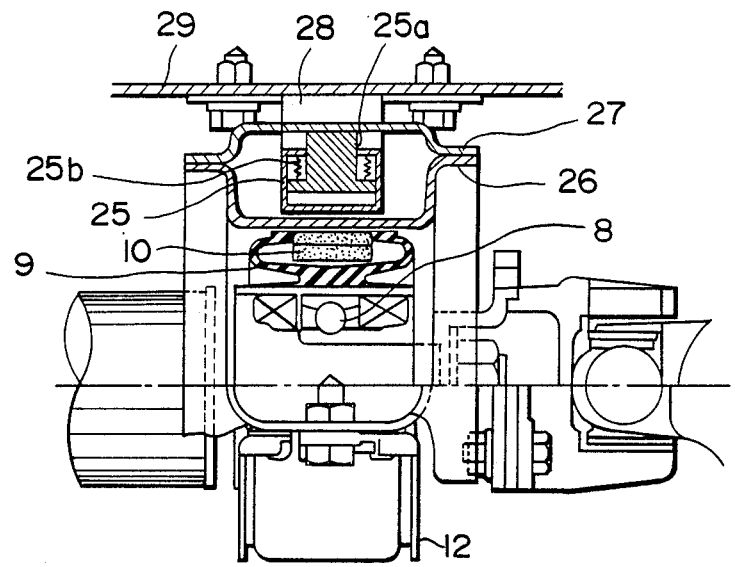
FIGS. 2a and 2b are front and side elevations showing details of a bracket structure for the center bearing rotatably supporting a predetermined portion of the propeller shaft assembly shown in FIG. 1.
Figure 2B:
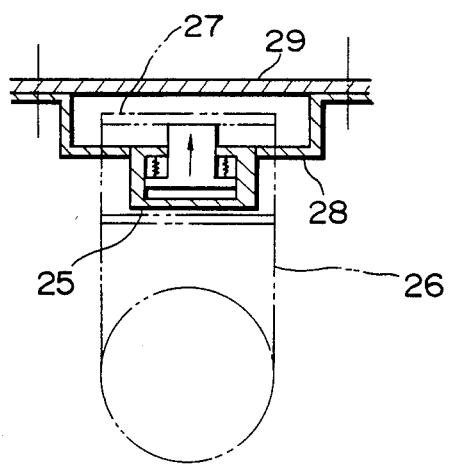

Next, a propeller shaft portion will be described. Referring to FIGS. 2a and 2b, a return spring 25b for the movable rod 25a is mounted on the actuator 25. An upper end portion of the movable rod 25a is associated with a lifting bracket 27 connected to an upper bracket 26 supporting a center bearing 8. Furthermore, a mounting flange of a bracket 28 connected to the side of the actuator 25 is fixed on a vehicle body 29.

Figure 3:
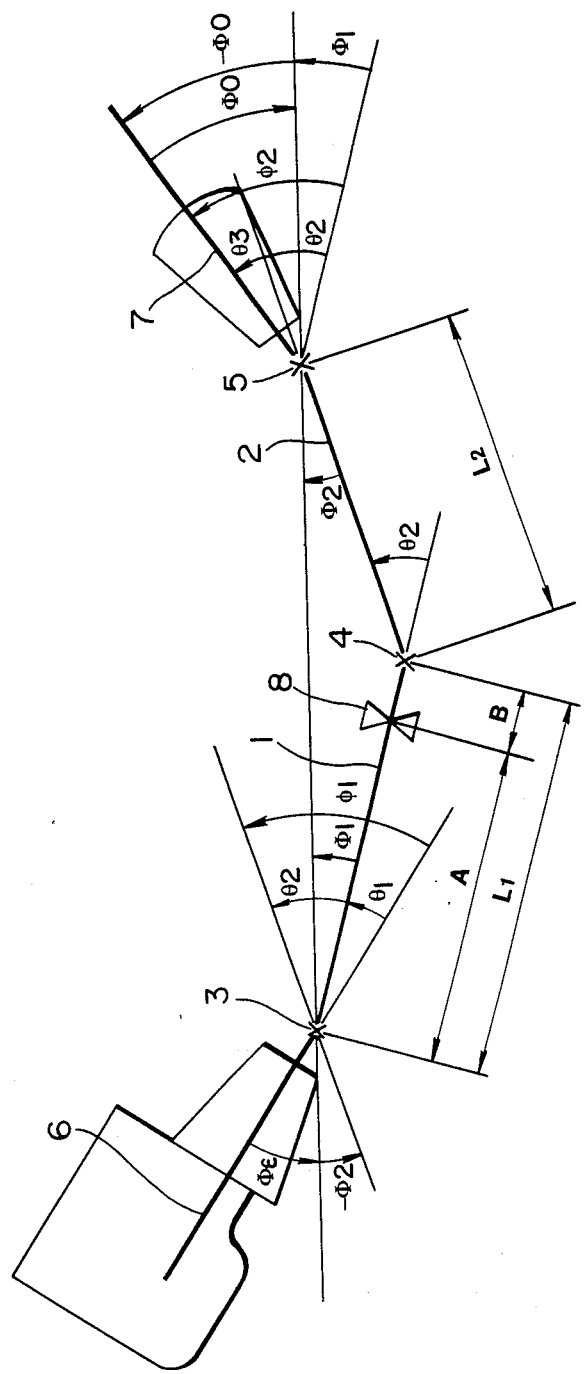
FIG. 3 is a diagrammatic view showing a model for analyzing angles of cardan joints.

The operation of the illustrated embodiment is as follows. As shown in FIG. 3, forces applied to the first, second and third cardan joints (referred to as exciting forces) are designated by $F_1$, $F_2$ and $F_3$ respectively. To exciting forces $F_1$, $F_2$ and $F_3$ can be expressed by the following formulas:

$$F_1 = \frac{T}{2}\left\{ \frac{1}{A}(\theta 1 + \theta 2) + \frac{B}{A \cdot L_2}(\theta 1 + \theta 2) \right\} \sin 2B \quad (1)$$

$$F_2 = \frac{T}{2}\left\{ \frac{1}{A}(\theta 1 + \theta 2) + \frac{L_1}{A \cdot L_2}(\theta 1 + \theta 2) \right\} \sin 2B \quad (2)$$

$$F_3 = \frac{T}{2}\left\{ \frac{1}{L_2}(\theta 2 + \theta 3) \right\} \sin 2B \quad (3)$$

wherein $\theta_1$ (theta one) is the angle between the main shaft and the first propeller shaft, $\theta 2$ (theta two) the angle between the first propeller shaft and the second propeller shaft, $\theta_3$ (theta three) the angle between the second propeller shaft and the differential, A the distance between the first cardan joint and the center bearing, B the distance between the second cardan joint and the center bearing, $L_1$ the length of the first propeller shaft, $L_2$ the length of the second propeller shaft, and T the torque of the drive shaft and, B (beta) the angle of rotation of the drive shaft. (When a yoke surface on the drive side is perpendicular to a surface formed by a drive shaft and a driven shaft, the angle B (beta) is assumed to be 0).

Figure 4:
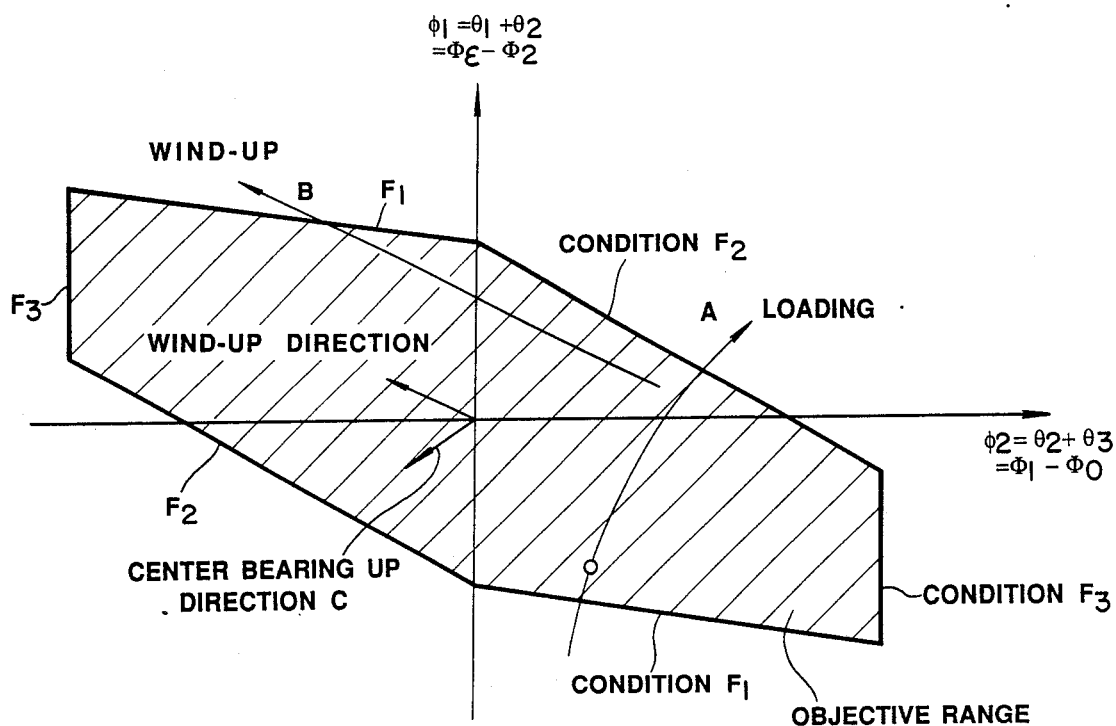
FIG. 4 is a diagrammatic view showing an angular range to be obtained by the present embodiment.

In this embodiment, an admissible angular range for the exciting forces $F_1$, $F_2$ and $F_3$ is set, as shown in FIG. 4, to limit the exciting forces $F_1$, $F_2$ and $F_3$ to predetermined values. There are two terms $(\theta_1+\theta_2)$ and $(\theta_2+\theta_3)$ as parameters of the above-mentioned formula (1) to (3). Designating the terms $(\theta_1+\theta_2)$ and $(\theta_2+\theta_3)$ by angles $\phi_1$ (phi one) and $\phi_2$ (phi two), respectively, the angles $\phi_1$ (phi one) and $\phi_2$ (phi two) are expressed by the following formulas:

$$\phi_1 = \theta_1 + \theta_2 = \Phi_E - \Phi_2 \ldots (4)$$

$$\phi_2 = \theta_2 + \theta_3 = \Phi_1 - \Phi_D \ldots (5)$$

wherein $\Phi_E$ (phi E), $\Phi_D$ (phi D), $\Phi_1$ (phi one) and $\Phi_2$ (phi two) are inclinations between the surface formed by the drive shaft and the driven shaft, and the engine, the differential, the first propeller shaft and the second propeller shaft respectively. When a rigid axle (axle suspension) type rear suspension vehicle such as a four-link or five-link vehicle is loaded, the inclination $\Phi_2$ (phi two) is decreased and also the inclination $\Phi_1$ (phi one) is slightly decreased, so that the angular condition varies in the direction of arrow A in FIG. 4. In this embodiment, a positional margin is made in the direction of wind-up by raising the supporting position of the center bearing in accordance with a live load. Then, when the differential is wound up by transmission of the driving torque, the inclination $\Phi_D$ (phi D) is increased and the inclination $\Phi_2$ (phi two) is slightly decreased, so that the angular condition varies in the direction of an arrow B. On the other hand, when the supporting position of the center bearing is raised, the inclination $\Phi_2$ (phi two) is increased and the inclination $\Phi_1$ (phi one) is decreased, so that the angular condition varies in the direction of arrow C.

As described above, a target angular range is set for the exciting forces $F_1$, $F_2$ and $F_3$, so that, when the exciting force $F_1$ acts in a manner to exceed the target angular range by wind-up during vehicle starting, the exciting force $F_1$ can be kept within the target angular range by raising the supporting position of the center bearing.

Figure 5:
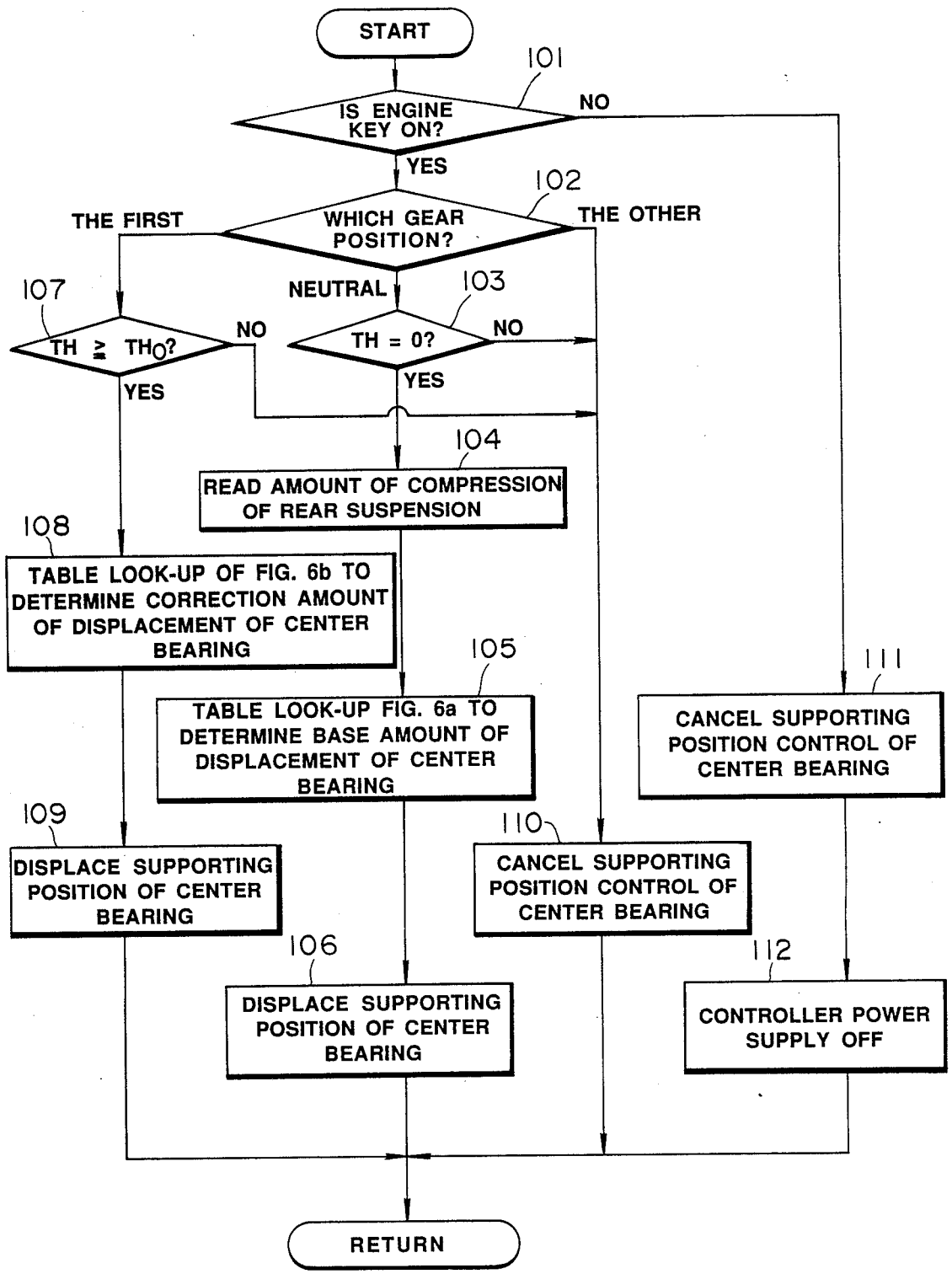
FIG. 5 is a flow chart showing a control program of the present embodiment.

Next, a control program stored in the controller 30 will be described with respect to a flow chart in FIG. 5.

Figure 6B:
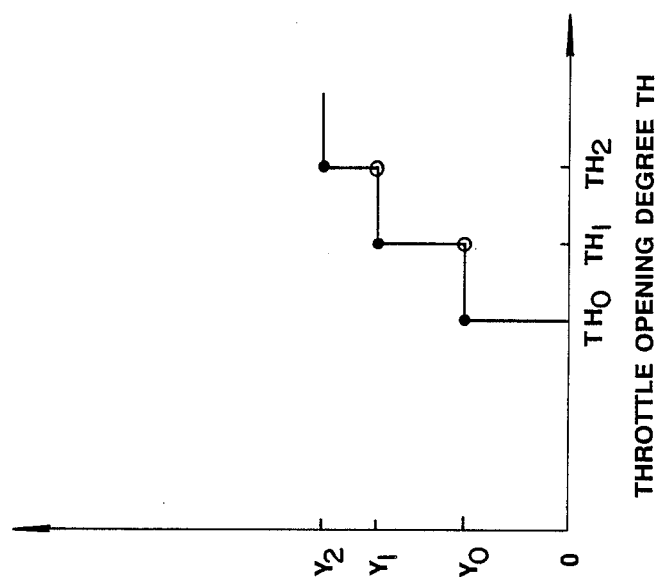
FIG. 6a and 6b are diagrammatic views showing characteristics of contents of two kinds of table data stored in the controller FIG. 6a illustrating the relation between a base amount of displacement of the supporting position of the center bearing and the amount of compression of a rear suspension, and FIG. 6b showing the relation between the amount of correction of the displacement of the supporting position of the center bearing and a throttle opening degree TH.
Figure 6A:
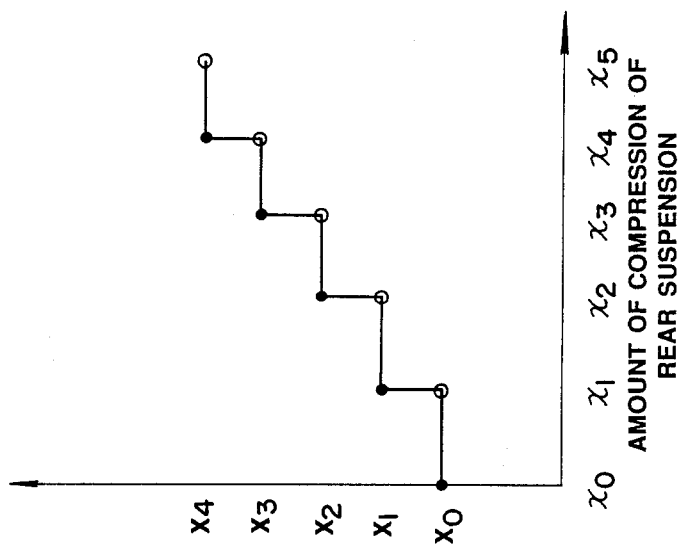

First, in step 101, it is judged whether an engine key is ON or not. If the engine key is ON, control proceeds to step 102 in which a gear position is checked. If the gear position is neutral, control proceeds to step 103. In step 103, it is judged whether the throttle opening degree TH is zero or not. When the throttle opening degree is 0, it is judged that the vehicle is at a standstill. Then, steps 104 to 106 are performed (Control up to step 106 is achieved from turning-on of the engine key to idling). In step 104, the amount of compression of the rear suspension is read by the position sensor 31 (potentiometer), and in step 105, a table look-up of a table as shown in FIG. 6a is performed to determine a base amount of displacement of a supporting position of the center bearing corresponding to the amount of compression. As shown in FIG. 6a, the table is stored in a ROM of the controller 30 and has the characteristics that the greater is the amount of compression, the greater will be the amount of displacement of the support position. In step 106, a control signal is provided from the controller 30 to the servo valve 23 through the servo amplifier 34 to lift or raise the supporting position of the center bearing by the displacement determined in step 105. As a result, the servo valve 23 is ON and the movable rod 25a of the actuator 25 is hydraulically actuated to lift or raise the supporting position of the center bearing.

Supporting position control of the center bearing in steps 101 to 106 is particularly effective when a 3-joint type propeller shaft is mounted on a rigid axle type rear suspension vehicle. In other words, in such vehicle, as soon as the vehicle position is changed by loading, the angle of the joint of the propeller shaft is also changed to induce a secondary couple, the angle of the joint of the propeller shaft is also changed to induce a secondary couple, causing vibration and noise during vehicle starting. Such vibration and noise can be reduced by supporting position control. A positional margin is made in direction of the wind-up (arrow B) by raising the supporting position of the center bearing (arrow C) as shown in FIG. 4, even if there is increase in load (arrow A).

In step 102, if it is judged that the gear position is the first gear position, control proceeds to step 107 in which the throttle opening degree TH is compared with a predetermined value $TH_0$. When the throttle opening degree TH is equal to or greater than the predetermined value $TH_0$, correction during vehicle starting of the supporting position of the center bearing is carried out in steps 108 and 109. Specifically, in step 108, in order to determine the amount of correction of the displacement of the supporting position of the center bearing corresponding to the throttle opening degree TH, a table look-up of a table as shown in FIG. 6b is performed. As shown in the table of FIG. 6b, the greater is the throttle opening degree TH, the greater will be the amount of correction of the displacement of the supporting position. In step 109, the supporting position of the center bearing is lifted or raised in a manner similar to that employed in step 106.

With supporting position control of the center bearing in steps 101, 102 and 107 to 109, if a very large torque is provided upon vehicle starting in the first gear position and the throttle opening degree more than a predetermined value, there occurs a further lifting or raising of the supporting position in addition to the above-mentioned lifting or raising when the vehicle is at a standstill, resulting in a decrease in vibration and noise due to secondary couple generated with angles of cardan joints when wind-up of the differential occurs.

If the gear position is other than the neutral or first gear in step 102 or if the throttle opening degree TH is not zero in step 103 or if the throttle opening degree TH is less than the predetermined value $TH_0$, the supporting position control of the center bearing is cancelled in step 110, since such control is not necessary when the vehicle is running after the starting operation or when the vehicle is at a standstill with the accelerator depressed. As a result, the servo valve 23 is OFF and the movable rod 25a of the actuator 25 returns to its initial position due to the force of the spring 25b.

In step 101, if it is determined that the engine key is OFF, the supporting position control of the center bearing is cancelled in step, 111 and the power supply of the controller 30 is turned off in step 112.

Having described an embodiment of the present invention, it is to be understood that the embodiment is illustrative and not restrictive and that various modifications and variations are possible in light of the above teachings. For example, if an independent type rear suspension is used, the propeller shaft assembly is not affected by an increase in load, so the position sensor 31 (potentiometer) and supporting position control of steps 103 to 106 may be omitted. Furthermore, the throttle opening degree TH used for determination in step 103 may be replaced by a throttle operating speed $V_{TH}$. Furthermore, the vehicle speed V provided from a vehicle speed sensor or the engine rotation signal $N_E$ provided from an engine rotation sensor may be used to determine whether the vehicle is at a standstill or not.

What is claimed is:

1. An automotive vehicle, comprising:
a vehicle body;
means for generating a driving power;
a propeller shaft assembly having one end operatively coupled with said driving power generating means and an opposite end;
a differential operatively coupled with said opposite end of said propeller shaft assembly;
driving wheels operatively coupled with said differential;
a center bearing rotatably supporting said propeller shaft assembly at a predetermined portion disposed between said one and opposite ends of said propeller shaft assembly;
a bracket structure supporting said center bearing and fixedly connected to said vehicle body;
sensor means for sensing operating conditions which the automotive vehicle is subject to and generating sensor output signals;
means for generating a control signal in response to said sensor output signals; and
said bracket structure including means responsive to said control signal for varying a position of said center bearing relative to said vehicle body.

2. An automotive vehicle as claimed in claim 1, wherein said driving power generating means include an engine with a throttle which opens in degrees, and a transmission operatively coupled with said engine.

3. An automotive vehicle as claimed in claim 2, including a suspension system operatively connected between said driving wheels and said vehicle body for supporting said vehicle body.

4. An automotive vehicle as claimed in claim 3, wherein said propeller shaft assembly includes a first propeller shaft having one end coupled with said transmission via a joint and an opposite end, a second propeller shaft having one end coupled with said opposite end of said first propeller shaft via a joint and an opposite end, said opposite end of said second propeller shaft being coupled with said differential via a joint.

5. An automotive vehicle as claimed in claim 4, wherein said sensor means include a throttle sensor means for sensing opening degree of said throttle and generating a throttle opening degree indicative signal indicative of said throttle opening degree sensed.

6. An automotive vehicle as claimed in claim 5, wherein said controlling means include a controller storing a table data containing different amounts of displacement of the position of said center bearing versus different values of said throttle opening degree indicative signal.

7. An automotive vehicle as claimed in claim 6, wherein said sensor means include a gear position sensor means for sensing which of various different positions said transmission is conditioned in and generating a transmission condition indicative signal indicative of the position which the transmission is conditioned in.

8. An automotive vehicle as claimed in claim 7, wherein said controller performs a table look-up operation of said table data based on said throttle opening degree indicative signal to determine an appropriate amount of displacement of the position of said center bearing against said throttle opening degree indicative signal when said throttle opening degree indicative signal is greater than a predetermined value and said transmission condition indicative signal indicates that said transmission is conditioned suitable for the automotive vehicle ready to start from a standtill.

9. An automotive vehicle as claimed in claim 8, wherein said sensor means further include a position sensor means for sensing a position of a predetermined portion of said suspension system relative to said vehicle body and generating a position indicative signal indicative of said relative position sensed.

10. An automotive vehicle as claimed in claim 9, wherein said controller stores a second table data containing different amounts of displacement of the position of said center bearing versus different values of said position indicative signal.

11. An automotive vehicle as claimed in claim 10, wherein said controller performs a table look-up operation of said second table data based on said position indicative signal to determine an appropriate amount of displacement of the position of said center bearing against said position indicative signal when said throttle indicative signal is substantially zero and said gear position indicative signal indicates that said transmission is in neutral.

12. An automotive vehicle as claimed in claim 1, wherein said bracket structure comprises a stationary bracket fixedly connected to said vehicle body, a movable bracket mounted on said stationary bracket and fixedly supporting said center bearing, and said varying means comprises a hydraulic actuator mounted on said stationary bracket, said hydraulic actuator including a piston with a piston rod integral with a stay fixedly connected to said movable bracket.

13. A method of suppressing noise derived from a drive system of an automotive vehicle including a vehicle body, a propeller shaft assembly, and a center bearing which rotatably supports the propeller shaft assembly, said method comprising the steps of:
sensing an operating condition of the automotive vehicle and generating a sensor output signal;
generating a control signal in response to said sensor output signal; and
varying the position of said center bearing relative to said vehicle body in response to said control signal.

14. A method as claimed in claim 13 wherein the step of sensing an operating condition of the vehicle comprises sensing the position of a portion of a rear suspension system of the vehicle relative to the vehicle body and generating a position signal indicative of the sensed position.

15. A method as claimed in claim 13 wherein the step of varying the position of the center bearing comprises moving the center bearing in a direction transverse to the propeller shaft assembly.

16. A method as claimed in claim 13 wherein the step of sensing an operating condition of the vehicle comprises the step of sensing the load acting on a rear suspension system of the vehicle.

17. A method as claimed in claim 13 wherein the step of sensing an operating condition of the vehicle comprises the step of sensing the gear position of a transmission connected to the propeller shaft assembly of the vehicle.

18. A method for suppressing noise in an automotive vehicle having a vehicle body, an engine with a throttle, a transmission operatively coupled with the engine, a propeller shaft assembly having a first end operatively coupled with the transmission and a second end, a differential operatively coupled with the second of the propeller shaft assembly, driving wheels operatively coupled with the differential, a rear suspension system operatively connected between the driving wheels and the vehicle body, a center bearing rotatably supporting the propeller shaft assembly between the first and second ends of the propeller shaft assembly, and a bracket structure supporting the center bearing and fixedly connected to the vehicle body, the method comprising:
sensing the degree of opening of the throttle and generating a throttle opening signal indicative of the sensed degree of opening;
sensing the gear position of the transmission and generating a gear position signal indicative of the gear position;
sensing the position of a portion of the rear suspension system relative to the vehicle body and generating a suspension position signal indicative of the sensed position;
performing a first table look-up operation of first data based on the suspension position signal to determine a base displacement of the position of the center bearing when the throttle opening signal is substantially zero and the gear position signal indicates that the transmission is in neutral; and
displacing the center bearing with respect to the vehicle body by the base displacement.

19. A method as claimed in claim 18 further comprising:
performing a second table look-up operation of second data based on the throttle opening signal to determine the amount of correction of the position of the center bearing when the throttle opening signal is greater than a predetermined value and the gear position signal indicates that the transmission is in first gear; and
displacing the center bearing from the base displacement by the amount of correction.

20. A method for suppressing noise in an automotive vehicle having a vehicle body, the method comprising:
sensing the degree of opening of a throttle of the vehicle and generating a throttle opening signal indicative of the sensed degree of opening;
sensing a gear position of a transmission of the vehicle and generating a gear position signal indicative of the gear position;
sensing the position of a portion of a rear suspension system of the vehicle relative to the vehicle body and generating a suspension position signal indicative of the sensed position;
performing a first table look-up operation of first data based on the suspension position signal to determine a base displacement of the position of a center bearing for supporting a transmission shaft of the vehicle when the throttle opening signal is substantially zero and the gear position signal indicates that the transmission is in neutral;
displacing the center bearing with respect to the vehicle body from an initial position by the base displacement;
performing a second table look-up operation of second data based on the throttle opening signal to determine the amount of correction of the position of the center bearing when the throttle opening signal is greater than a predetermined value and the gear position signal indicates that the transmission is in first gear;
displacing the center bearing from the base displacement by the amount of correction; and restoring the center bearing to the initial position when the gear position signal indicates that the gear position is other than neutral or first gear.

21. A method for suppressing noise in an automotive vehicle having a vehicle body, drive means for generating drive power, a propeller shaft assembly having a first end operatively coupled with the drive means and a second end, a differential operatively coupled with the second end of the propeller shaft assembly, driving wheels operatively coupled with the differential, a rear suspension system operatively connected between the driving wheels and the vehicle body, a center bearing rotatably supporting the propeller shaft assembly at a predetermined portion between the first and second ends of the propeller shaft assembly, and a bracket structure supporting the center bearing and fixedly connected to the vehicle body, the method comprising:
  sensing an operating condition of the vehicle and generating a sensor output signal;
  generating a control signal in response to the sensor output signal; and
  varying the position of the center bearing relative to the vehicle body in response to the control signal.

22. A method for suppressing noise in an automotive vehicle having a vehicle body, drive means for generating drive power, a propeller shaft assembly having a first end operatively coupled with the drive means and a second end, a differential operatively coupled with the second end of the propeller shaft assembly, driving wheels operatively coupled with the differential, a rear suspension system operatively connected between the driving wheels and the vehicle body, a center bearing rotatably supporting the propeller shaft assembly at a predetermined portion between the first and second ends of the propeller shaft assembly, and a bracket structure supporting the center bearing and fixedly connected to the vehicle body, the method comprising:
  sensing a position of a predetermined portion of the rear suspension system relative to the vehicle body and generating a position signal indicative of the sensed position;
  generating a control signal in response to the position signal; and
  varying the position of the center bearing relative to the vehicle body in response to the control signal.

23. A method of suppressing noise in an automotive vehicle equipped with a vehicle body, an engine having a throttle which can be opened and closed, a transmission operatively coupled with the engine, a propeller shaft assembly having a first end operatively coupled with the transmission and a second end, a differential operatively coupled with the second end of the propeller shaft, driving wheels operatively coupled with the differential, a rear suspension system operatively connected between the driving wheels and the vehicle body, a center bearing rotatably supporting the propeller shaft assembly between the first and second ends of the propeller shaft assembly, and a bracket structure supporting the center bearing and fixedly connected to the vehicle body, the method comprising:
  sensing the degree of opening of the throttle and generating a throttle opening signal indicative of the sensed degree of opening;
  sensing the gear position of the transmission and generating a gear position signal indicative of the gear position; and
  performing a table look-up operation of data based on the throttle opening signal to determine the appropriate amount of displacement of the position of the center bearing when the throttle opening signal is greater than a predetermined value and the gear position signal indicates that the automotive vehicle is ready to start from a standstill.

24. A method of suppressing noise in an automotive vehicle equipped with a vehicle body, an engine having a throttle which can be opened and closed, a transmission operatively coupled with the engine, a propeller shaft assembly having a first end operatively coupled with the transmission and a second end, a differential operatively coupled with the second end of the propeller shaft, driving wheels operatively coupled with the differential, a rear suspension system operatively connected between the driving wheels and the vehicle body, a center bearing rotatably supporting the propeller shaft assembly between the first and second ends of the propeller shaft assembly, and a bracket structure supporting the center bearing and fixedly connected to the vehicle body, the method comprising:
  sensing the degree of opening of the throttle and generating a throttle opening signal indicative of the sensed degree of opening;
  sensing the gear position of the transmission and generating a gear position signal indicative of the gear position;
  performing a first table look-up operation of first data based on the throttle opening signal to determine the appropriate amount of displacement of the position of the center bearing when the throttle opening signal is greater than a predetermined value and the gear position signal indicates that the automotive vehicle is ready to start from a standstill;
  sensing the position of a portion of the rear suspension system relative to the vehicle body and generating a suspension position signal indicative of the sensed position; and
  performing a second table look-up operation of second data based on the suspension position signal to determine the appropriate amount of displacement of the position of the center bearing when the throttle opening signal is substantially zero and the gear position signal indicates that the transmission is in neutral.

25. A method as claimed in claim 24 further comprising:
  displacing the center bearing with respect to the vehicle body by the amount determined in the second table look-up operation when the throttle opening signal is substantially zero and the gear position signal indicates that the transmission is in neutral and displacing the center bearing by the amount determined in the second table look-up operation as corrected by the amount determined in the first table look-up operation when the throttle opening signal is greater than a predetermined value and the gear position signal indicates that the automotive vehicle is ready to start from a standstill.

* * * * *

UNITED STATES PATENT AND TRADEMARK OFFICE
CERTIFICATE OF CORRECTION

PATENT NO. : 4,966,251

DATED : October 30, 1990

INVENTOR(S) : Yoshinori Hirano

It is certified that error appears in the above-identified patent and that said Letters Patent is hereby corrected as shown below:

```
Column 7, line 3, change "standtill" to --standstill--;
   "     "  line 68, after "second" insert --end--.
```

Signed and Sealed this

Nineteenth Day of May, 1992

Attest:

DOUGLAS B. COMER

Attesting Officer

Acting Commissioner of Patents and Trademarks